United States Patent [19]

Hubert et al.

[11] Patent Number: 5,710,199
[45] Date of Patent: Jan. 20, 1998

US005710199A

[54] AUTOMOTIVE ADDITIVES AND SEALANTS CONTAINING WASTE POWDER PRIME

[76] Inventors: James F. Hubert, 21615 Holly Crest Dr., Brookfield, Wis. 53045; Richard A. Rinka, S83 W17491 Cedarcrest La., Muskego, Wis. 53150

[21] Appl. No.: 666,170

[22] Filed: Jun. 19, 1996

[51] Int. Cl.⁶ .................... C08K 5/524; C08K 5/12; L08J 11/26
[52] U.S. Cl. .................... 524/141; 524/292; 524/293; 524/296; 524/145; 521/40; 521/48
[58] Field of Search ................... 524/141, 292, 524/296, 293, 145; 521/48, 40

[56] References Cited

U.S. PATENT DOCUMENTS

| | | | |
|---|---|---|---|
| 2,702,282 | 2/1955 | Shamp | 521/48 |
| 2,968,638 | 1/1961 | Meckler | 521/48 |
| 3,736,277 | 5/1973 | Bender | 521/48 |
| 4,100,066 | 7/1978 | Bloomer et al. | 210/44 |
| 4,303,559 | 12/1981 | Trost | 521/40 |
| 4,980,030 | 12/1990 | Johnson et al. | 203/4 |
| 5,006,585 | 4/1991 | DiBella | 524/293 |
| 5,160,628 | 11/1992 | Gerace et al. | 210/667 |
| 5,254,263 | 10/1993 | Gerace et al. | 210/667 |

FOREIGN PATENT DOCUMENTS

| | | | |
|---|---|---|---|
| 344946 | 12/1989 | European Pat. Off. | 521/40 |
| 105465 | 6/1982 | Japan | 521/48 |
| 1081190 | 3/1984 | Russian Federation | 524/141 |
| 1700016 | 12/1991 | Russian Federation | 521/48 |

*Primary Examiner*—Peter A. Szekely
*Attorney, Agent, or Firm*—Ernest G. Szoke; Wayne C. Jaeschke; Martin G. Meder

[57] ABSTRACT

The present invention is directed to compositions for use as additives in the automotive industry, which compositions contain waste powder prime and a plasticizer selected from the group consisting of 2-ethylhexyl diphenyl phosphate, diisoheptyl phthalate, a linear phthalate based upon $C_7$–$C_9$ alcohols, a mixture of esters containing a minimum of 55 percent of diesters and a maximum of 20 percent dibenzoate, a mixture of esters containing a minimum of 60 percent of diesters and a maximum of 30 percent dibenzoate and dipropylene glycol dibenzoate and automotive sealants which contain waste powder prime, a plasticizer selected from the group consisting of 2-ethylhexyl diphenyl phosphate, diisoheptyl phthalate, a linear phthalate based upon $C_7$–$C_9$ alcohols, a mixture of esters containing a minimum of 55 percent of diesters and a maximum of 20 percent dibenzoate, a mixture of esters containing a minimum of 60 percent of diesters and a maximum of 30 percent dibenzoate and dipropylene glycol dibenzoate and automotive sealants; and a polymeric resin.

9 Claims, No Drawings

5,710,199

AUTOMOTIVE ADDITIVES AND SEALANTS CONTAINING WASTE POWDER PRIME

FIELD OF THE INVENTION

The invention relates to compositions which may be used in the automotive industry, particularly as additives in the preparation of automotive sealants.

BACKGROUND OF THE INVENTION

In the manufacture of automobiles, the bodies and frame assemblies thereof are coated, or primed, electrostatically with a 100 percent solids powder spray. The compositions of such powder sprays, referred to in the automotive industry as "powder prime", and methods of electrostatically applying the powder prime are well known to those skilled in the automotive industry. It is estimated that on the order of 25,000 pounds per month of 100 percent solids waste powder prime may be generated at each assembly plant in which it is used to prime auto parts, such as frame assemblies. The waste powder prime, that prime which does not remain affixed to the primed auto part and which is recovered subsequent to the electrostatic deposition of the powder prime thereon, currently is being transported to landfills for disposal. It would be considered to be a significant environmental advance and contribution if one were to discover a use of waste powder prime, such that the present practice of disposing of waste powder prime in landfills could be reduced significantly, or totally eliminated.

Also in the manufacture of automobiles, automotive sealants are used in order to prevent air, water and dust intrusion into the passenger compartment of the automobile. These sealants typically are made of plastisols, those being mixtures of plasticizers and polymeric resins such as poly(vinyl chloride), poly(vinyl acetate), or copolymers of vinyl chloride and vinyl acetate. Other polymers may be used as well in preparation of the plastisols. The sealants further may contain ingredients such as fillers, for instance calcium carbonate, talc, calcium oxide, and glass hollowspheres; rheological additives such as thixotropes, for instance silicas and clay derivatives, and pigments, for instance titanium dioxide and carbon black. Because the adhesion of a plastisol to cold-rolled-steel or electrodeposition coatings (E-coat) is poor, conventional sealants must contain adhesion promoters. The most common of the adhesion promoters used in preparation of the sealants is polyamidoamines. Without the adhesion promoters, such sealants will exhibit poor adhesion to such substrates as cold rolled steel and the E-coat.

It has been reported that waste paint sludge which is recovered from automotive "painting" processes and which contains water, solvent and uncured polymer, may be used in the preparation of automotive sealants. However, before the waste paint sludge may be used to prepare automotive sealants, the waste paint sludge must undergo extensive treatment and processing to remove all or most of the water or solvent from the waste sludge. The "painting" operations from which the waste sludge is recovered differ from the "electrostatic deposition" from which the waste powder prime is recovered. The powder prime never contains water or solvent, either as a virgin material or as a waste material. Additionally, the powder prime does not utilize ingredients such as tackifiers, plasticizers and coalescents, which commonly are used in film-forming "paints" formulated with water and/or solvents.

The present inventors surprisingly have discovered that waste powder prime may be used, without further recycling or treatment, in order to formulate compositions which may be used in the automotive industry. Specifically, the inventors surprisingly have discovered that waste powder prime may be used in combination with specific plasticizers in order to prepare compositions which may be used as additives in the automotive industry. In particular, the additives are used in the preparation of automotive sealants.

The inventors can identify at least three distinct advantages of their invention over the prior art paint sludge. First, the waste powder prime requires no processing to remove unwanted solvent or water prior to its use in the preparation of automotive sealants. Second, the waste powder prime typically is free or essentially free of components such as tackifiers, plasticizers and coalescents, which commonly are used in film-forming "paints" formulated with water and/or solvents. As a result, in the formulation of compositions which utilize waste powder prime, the formulator need not be concerned with detrimental affects such components might have on the particular formulated compositions. Finally, the present invention provides a practical and economical solution to a significant environmental need by reducing or eliminating the amount of waste powder prime which is disposed of in landfills, without the need for extensive and expensive recycling processes, while unexpectedly providing improvements in automotive compositions which have not been reported heretofore. It is believed that each of the above advantages in and of itself constitutes a significant improvement over the prior art "paint sludge" containing water and solvent, as discussed above. In addition to the fact that all three of the above advantages may be realized simultaneously, the compositions of the present invention offer other advantages which are disclosed herein below.

SUMMARY OF THE INVENTION

The present invention is directed to compositions which may be used as additives in the automotive industry, which compositions comprise waste powder prime (WPP) and a plasticizer selected from the group consisting of 2-ethylhexyl diphenyl phosphate, diisoheptyl phthalate, a linear phthalate based upon $C_7$–$C_9$ alcohols, a mixture of esters, and dipropylene glycol dibenzoate. When used as an additive, in the preparation of formulated automotive sealants which are substantially free of an adhesion promoter, or preferably which are free of an adhesion promoter, the inventive additives provide sealants which exhibit adhesion which is as good as or better than conventional automotive sealants which do contain an adhesion promoter in conventional amounts used to provide adhesion to automotive sealants. Also included within the scope of the present invention are automotive sealant compositions which comprise a polymeric resin, WPP and a plasticizer selected from the group consisting of 2-ethylhexyl diphenyl phosphate, diisoheptyl phthalate, a linear phthalate based upon $C_7$–$C_9$ alcohols, a mixture of esters, and dipropylene glycol dibenzoate.

DETAILED DESCRIPTION OF THE INVENTION

The compositions of the present invention which may be used as additives in the automotive industry comprise a dispersion of WPP in a plasticizer selected from the group consisting of 2-ethylhexyl diphenyl phosphate, diisoheptyl phthalate, a linear phthalate based upon $C_7$–$C_9$ alcohols, a mixture of esters, and dipropylene glycol dibenzoate, at a weight ratio of WPP: plasticizer of 1:10 to 10:1. Unless specifically stated otherwise, all percentages of components referred to herein are weight percent based on the total weight of the composition containing such components. The exact ratio of WPP: plasticizer will be determined by various factors. For instance, the desired viscosity of the composition which utilizes the inventive additives will be a factor. The particular substrate to which the composition is applied is another factor to be considered in choosing the appropriate ratio of WPP to plasticizer. For instance, adhesion and film-forming properties of the compositions will differ when applied to a cold-rolled-steel substrate, for example, versus a surface which has been primed or E-coated with a spray prime or powder prime. One skilled in the art, once having the benefit of this disclosure, would be able to ascertain readily the desired weight ratio of WPP: plasticizer, based on such considerations.

Compositions of WPP are well known to those skilled in the automotive industry and are dependent upon the specific powder prime which was used to electrostatically coat the parts of the automobile. Typically, WPP will contain a polymeric resin, such as a polyester, a polyester/acrylic copolymer or a polyester/acrylic/polyurethane terpolymer. The WPP may be used directly in preparing the additive compositions, i.e. without the need for further treatment or processing of the WPP after it has been recovered from the electrostatic powder priming process. The composition of a typical WPP is set forth in Table 1. As one skilled in the automotive industry would know, the exact composition of WPP will depend on the particular powder prime formulation used to electrostatically coat the auto bodies and frame assemblies. As such, the composition of Table 1 should not be construed as the only WPP which finds utility in the present invention. Rather, the waste powder prime generated from any of the conventional electrostatic deposition processes which utilize conventional powder primes could be used in the present invention.

TABLE 1

| Powder Prime | | |
|---|---|---|
| CAS Number | Ingredient | Weight Percent |
| 13463-67-7 | Titanium Dioxide | 5–10 |
| 1333-86-4 | Carbon Black | 0–1 |
| 7727-43-7 | Barium Sulfate | 0–5 |
| None | Acid Functional Polyester Resin | 0–5 |
| None | Acrylic Polymer | 0–2 |
| 693-23-2 | 1,12 Dodecanedioic Acid | 10–20 |
| 119-53-9 | Benzoyl Carbinol | 0–2 |
| None | Glydicyl Acrylic Polymer | 60–80 |
| None | Bisphenol A Diglyicidyl Ether Polymer | 0–3 |
| 7631-86-9 | Silica | 0–1 |

The plasticizers used in preparing the additive compositions must have certain properties when combined with the WPP. When formulated into compositions which are used in the automotive industry, for example automotive sealants, the additives must provide compositions which are stable to excessive viscosity changes over time, i.e., the compositions are viscosity-stable. In order for the compositions to be viscosity-stable, the additive comprising the WPP and the plasticizer also must be viscosity-stable. Preferably, a dispersion of the WPP in the plasticizer, at a 1:1 weight ratio, will exhibit a change in viscosity of less than 190 percent, preferably less than 150 percent, and even more preferably less than 100 percent, after 72 hours at a temperature of 25° C. The plasticizer also must be nonvolatile to the extent it does not volatilize at temperatures commonly used in those processes utilized within the automotive industry which might employ the additives of the present invention. In addition to be being stable to excessive viscosity change, the plasticizer must provide dispersions which do not gel, solidify, precipitate, or otherwise undergo physical changes which would render the dispersions unsatisfactory for their intended use.

Plasticizers which were found to provide a WPP/plasticizer dispersion having excellent stability, are 2-ethylhexyl diphenyl phosphate (available from Monsanto under the trade name Santicizer 141, CAS #1241-94-7), having a change of 24 percent and diisoheptyl phthalate (available from Exxon Chemical under the trade name Jayflex 77, CAS #71888-89-6), having a change of 38 percent. Accordingly, the preferred plasticizers used in preparing the additive compositions are selected from the group consisting of 2-ethylhexyl diphenyl phosphate and diisoheptyl phthalate.

Plasticizers which were found to provide good to fair stability include a linear phthalate based upon $C_7$–$C_9$ alcohols (available from BASF under the trade name Palatinol 79P, a mixture of CAS #s 68515-45-7, 68515-44-6 and 111381-89-6), having a change of 114 percent; a mixture of esters containing from about 50 to about 85 percent of 2-methyl-3-(benzoyloxy)-2,2,4-trimethylpentyl ester (CAS #22527-63-5), from about 10 to 30 percent of 2,2,3-trimethyl-1,3-pentanediol dibenzoate (CAS #68052-23-3) and from about 5 to about 10 percent of 2-methyl-2,2-dimethyl-1-(1-methylethyl)-1,3-propanediyl ester (CAS #6846-50-0) (available from Huls America under the trade names Nuoplaz 6000 and Nuoplaz 1046). The Nuoplaz 6000 was tested and found to exhibit a change of 137 percent. Another plasticizer exhibiting fair viscosity stability is dipropylene glycol dibenzoate (available from Kalama Chemical under the trade name K-Flex DP, CAS #27138-31-4), having a change of 186 percent.

Plasticizers which were found to provide WPP/plasticizer dispersions having poor stability, eg. greater than 200 percent viscosity change, include chlorinated $C_{14}$–$C_7$ alkanes, (too thick to test) (available from ICI Forest Products under the trade name Cereclor S45, CAS #85535-85-9); polyester adipate (too thick to test) (available from C.P. Hall under the trade name Plasthall P-760, Cas #103-21-1); and Texanol benzyl phthalate (too thick to test) (available from Monsanto under the trade name Santicizer 278, CAS #16883-83-3). Other such plasticizers include diisononyl phthalate (268 percent change) (Jayflex DINP, CAS #68515-48-0); diisodecyl phthalate (206 percent change) (Jayflex DINA, CAS #33703-08-1); Di-L-Nonyl phthalate (238 percent change) (Jayflex L9P, CAS # unknown); and Di-(2-ethylhexyl) Adipate (286 percent change) (Jayflex DOA, CAS #103-23-1), all of which are available from Exxon Chemical under the respective Jayflex trade name. Additional plasticizers providing poor stability include a petroleum distillate (Viplex 885, CAS #68477-29-2) and a heavy paraffinic distillate solvent extract (Viplex 530-A), both of which are available from Crowley Chemical under the respective Viplex trade name and both of which were too thick to test. In addition to the excessive viscosity change over 72 hours at 25° C., many of the "poor" plasticizers exhibited gelling, solidification or physical changes over time, which would make the combinations of those plasticizers and WPP unacceptable for compositions according to the present invention.

When used in automotive sealants, in addition to being stable, the additives must provide the sealants with shear strength and tensile strength which are sufficient for the sealants intended use. In addition to the WPP and selected plasticizer, automotive sealants according to the present invention also will contain a polymeric resin of the type used to prepare conventional automotive sealants. The polymeric resin basically is used in the sealant as a film-former. Accordingly, the polymeric resin will be present in the sealant in amounts effective to provide the automotive sealant with film-forming properties which are sufficient for the particular end-use of the sealant. Once having the benefit of this disclosure, one skilled in the art of automotive sealants will be able to ascertain readily the exact amount of the polymeric resin required to provide the particular film-forming properties for the particular end-use. Exemplary polymeric resins include poly(vinyl chloride) (PVC), poly (vinyl acetate) (PVAc), or copolymers of vinyl chloride and copolymers of vinyl acetate. Other polymers conventionally used to prepare conventional automotive sealants may be used as well. Preferably, the polymeric resin is PVC.

The automotive sealant will contain from about 10 to about 50 percent of the polymeric resin, preferably from about 15 to about 40 percent of the polymeric resin, and more preferably from about 20 to about 25 percent. The automotive sealant will contain from about 0.1 to about 50 percent of the WPP, preferably from about 5 to about 40 percent of the WPP, and more preferably from about 10 to about 30 percent of the WPP. The automotive sealant will contain from about 0.1 to about 50 percent of the plasticizer, preferably from about 5 to about 40 percent of the plasticizer, and more preferably from about 25 to about 30 percent of the plasticizer.

Automotive sealants according to the present invention do not require adhesion promoters in order to bond to primed surfaces and E-coat. In some cases, adhesion of automotive sealants which contain the inventive additive containing WPP and plasticizer, yet which do not contain an adhesion promoter of the type used to prepare conventional automotive sealants in effective amounts used to prepare conventional automotive sealants, is greater than or equal to that of a conventional sealant which contains an adhesion promoter. While the automotive sealants of the present invention may contain small amounts of an adhesion promoter of the type used to prepare conventional automotive sealants in order to improve adhesion to cold-rolled-steel substrates, the automotive sealants of the present invention preferably are substantially free of an adhesion promoter of the type used to prepare conventional automotive sealants, and even more preferably the sealants are free of such adhesion promoters. By substantially free of an adhesion promoter, it is meant that the automotive sealants do not contain an adhesion promoter in such concentrations as are conventionally used in preparing conventional automotive sealants which contain adhesion promoters and which do not contain WPP, or concentrations which would materially affect or alter the characteristics or properties of the automotive sealant according to the present invention.

When used, the adhesion promotion system used in the sealant formulation preferably contains an unsaturated organosilane; an acrylic monomer; and an unsaturated acid or anhydride monomer. Most preferably it also contains an epoxy resin or modified epoxy resin and a hardening agent for the epoxy resin, such as a polyamide or modified polyamide. Examples of unsaturated organosilanes are vinyl trichlorosilane, vinyl triethoxy silane, vinyl trimethoxy silane, vinyl-tris B-methoxy-ethoxy silane, 3-methacryloxypropyl trimethoxy silane. Examples of acrylic monomers are trimethylolpropane trimethacrylate, hexane diol diacrylate, and butyl methacrylate. Examples of unsaturated acid or anhydride monomers are maleic, acrylic, crotonic, methacrylic, oleic, linoleic, and tetrahydrophthalic acid or anhydride.

Examples of unmodified epoxy resins are those based on bisphenol-A and epichlorohydrin with typical properties that includes an epoxy value of 152 to 155 equiv/100 g and a weight per epoxide of 182 to 192. Other typical epoxy resins are phenol novolac, triphenylolmethane and tetrabromo bis-A. An example of a modified epoxy resin includes the preferred elastomeric modified liquid epoxy resin which is a 40% adduct of carboxylated acrylonitrile butadiene elastomer and a liquid bis-phenol-A and epichlorohydrin type epoxy. That adduct has a weight per epoxide of 325 to 375. Curing for the epoxy or modified epoxy resin is accomplished by reacting the resin with an appropriate curing or hardening agent. Typical hardening agents are polyamides, diethylenetriamine, methane diamine, m-phenylene diamine, phenol, dicyandiamide, BF3-monoethyl amine and nadicmethyl anhydride. Preferred is a modified polyamide hardening agent such as a latent polyamide dispersion which is an adduct of phthalic anhydride and diethylenetriamine in an unmodified liquid epoxy resin. The most common of the adhesion promoters used in preparation of conventional automotive sealants are polyamidoamines. When used, the adhesion promoters will comprise from about 0.5 to about 5 percent of the sealant.

The sealants further may contain components such as fillers, for instance calcium carbonate, talc, calcium oxide, and glass hollowspheres; rheological modifiers such as thixotropes, for instance silicas and clay derivatives; solvents such as odorless mineral spirits; and pigments, for instance titanium dioxide and carbon black. Each component is used in amounts effective to perform the specific function for which the component is used. Filler concentrations used in the automotive sealants may vary from about 5 to about 60 percent. Rheological modifier concentrations used in the automotive sealants may vary from about 1 to about 10 percent. Solvent concentrations used in the automotive sealants may vary from 0 to about 5 percent. Pigment concentrations used in the automotive sealants may vary from 0 to about 5 percent. It should be noted that, while the sealants will contain pigment which has been incorporated via the WPP, additional pigment may be added when formulating a particular automotive sealant, although it is not required.

In preparing the automotive sealants of the present invention, a stable dispersion of the waste powder prime in the plasticizer is prepared by admixing the plasticizer and the WPP in a mixer, such as a Cowles mixer, at ambient temperatures and at blade speeds which are effective to form the stable dispersion. The dispersion then is admixed in a mixer, such as a Cowles mixer, at ambient conditions with the polymeric resin and, where desired, other optional components as described above. The mixing procedures are very basic and are well known to those skilled in the art of preparing automotive sealants.

The following examples are set forth to exemplify certain embodiments of the present invention and should not be construed to limit the scope of the invention in any way. The scope of the invention is limited only by the claims appended hereto.

An automotive sealant according to the present invention was prepared and is identified as Sealant 2 in Table 2. A comparative automotive sealant also was prepared and is identified as Sealant 1 in Table 2.

TABLE 2

| Component | Sealant 1 | Sealant 2 |
|---|---|---|
| 2-ethylhexyl diphenyl phosphate | 30.30 | 28.28 |
| PVC Resin | 28.47 | 23.03 |
| Filler | 37.47 | 31.11 |
| Solvent | 0.40 | 2.02 |
| Thixotrope | 1.55 | 0.40 |
| Adhesion Promoter | 0.49 | 0.00 |
| Pigment | 1.32 | 0.00 |
| WPP of Table 1 | 0.00 | 15.15 |
| TOTAL | 100.00 | 99.99 |

Sealants 1 and 2 were evaluated according to the following test protocol. Results of the evaluation are set forth in Table 3.

TEST PROTOCOL

Viscosity-stability:

The viscosity-stability of the dispersion of the WPP in plasticizer was determined as follows. The viscosity of the dispersion was measured with a Brookfield RVT viscometer, at 20 rpm, with the spindle selection being dependent upon the viscosity range of the dispersion to be measured. The dispersion then is allowed to stand for 72 hours at 25° C. The viscosity of the standing dispersion then is measured again and the percent viscosity change calculated.

Physical properties:

The following standard ASTM methods were conducted in order to generate the data contained in Table 3. All methods are standard methods used in the automotive field to characterize the respective physical properties of automotive sealants.

Shear strength:

ASTM D1002-94, modified such that the bond line in the test procedure is 0.03 inch with a 1 inch overlap, versus the standard ASTM procedure having a bond line of 0.001 inch and a 0.5 inch overlap. The exact bond line and overlap selected may depend on factors such as sealant formulation, substrate and customer specifications.

Tensile strength: ASTM D638-94b, unmodified
Elongation: ASTM D638-94b, unmodified

TABLE 3

| Property | Sealant 1 | Sealant 2 |
|---|---|---|
| Density | 1.40 | 1.40 |
| Solid Content | >96% | 98% |
| Viscosity (.104", 40psi) | 18–22 seconds | 10–15 seconds |
| Sag Resistance | 2 mm | 2 mm |
| Pressure Stability 3000psi/24hrs | No caking or separation | No caking or separation |
| Shear Strength | 315.0 psi | 330.0 psi |
| Tensile Strength | 310.0 psi | 315.0 psi |
| Elongation | 240% | 240% |
| Reflow Characteristic | No visible grooves | No visible grooves |

As the data indicate, Sealant 2 surprisingly exhibits properties of strength and elongation which are as good as, if not better than, the comparative automotive sealant which contains an adhesion promoter. Additionally, other properties of Sealant 2, for example, elevated stability and paintability, are equivalent to comparative Sealant 1. As a result of using WPP in formulating the automotive sealant, the adhesion promoter may be removed altogether and the concentrations of both the polymeric resin and the filler may be reduced significantly and replaced with WPP. Accordingly, not only is the invention environmentally advantageous and as good as or better than conventional sealants with respect to adhesion and the like, but the present invention may provide a significant cost reduction in the automotive sealants formulated therewith, in that virgin raw materials, such as the resin, filler and adhesion promotor, may be replaced with WPP.

We claim:

1. A composition, comprising:

waste powder prime; and a plasticizer selected from the group consisting of 2-ethylhexyl diphenyl phosphate, diisoheptyl phthalate, a linear phthalate based upon $C_7$–$C_9$ alcohols, a mixture of esters containing from about 50 to about 85 percent of 2-methyl-3-(benzoyloxy)-2,2,4-trimethylpentyl ester (CAS #22527-63-5), from about 10 to 30 percent of 2,2,3-trimethyl-1,3-pentanediol dibenzoate (CAS #68052-23-3) and from about 5 to about 10 percent of 2-methyl-2,2-dimethyl-1-(1-methylethyl)-1,3-propanediyl ester and dipropylene glycol dibenzoate, wherein the waste powder prime and the plasticizer are present in amounts effective to provide a viscosity-stable dispersion of the waste powder prime in the plasticizer.

2. The composition of claim 1 wherein the waste powder prime and the plasticizer are present at a weight ration of about 1:10 to about 10:1.

3. The composition of claim 1 wherein the plasticizer is selected from the group consisting of 2-ethylhexyl diphenyl phosphate, diisoheptyl phthalate, a linear phthalate based upon $C_7$–$C_9$ alcohols, and dipropylene glycol dibenzoate.

4. The composition of claim 1 wherein the plasticizer is selected from the group consisting of 2-ethylhexyl diphenyl phosphate and diisoheptyl phthalate.

5. The composition of claim 1 further comprising a polymeric resin of the type used to prepare conventional automotive sealants, in amounts effective to provide film-forming properties to the automotive sealant.

6. The composition of claim 5 comprising from about 0.1 to about 50 percent of the waste powder prime, from about 0.1 to about 50 percent of the plasticizer and from about 10 to about 50 percent of the polymeric resin.

7. The composition of claim 6 wherein the polymeric resin is selected from the group consisting of poly(vinyl chloride), poly(vinyl acetate), copolymers of vinyl chloride and copolymers of vinyl acetate.

8. The composition of claim 1 further comprising a component selected from the group consisting of an adhesion promoter, a filler, a solvent and a rheology modifier, in amounts effective to perform the specific function for which the component is used.

9. The composition of claim 1 wherein said composition is free of adhesion promoters.

* * * * *